US012095606B1

(12) United States Patent
Jie et al.

(10) Patent No.: US 12,095,606 B1
(45) Date of Patent: Sep. 17, 2024

(54) SIGNIFICANCE ORDERED PREFIX TREE FOR COMPUTE-EFFICIENT ROOT CAUSE INVESTIGATION

(71) Applicant: Microsoft Technology Licensing, LLC, Redmond, WA (US)

(72) Inventors: Mengmeng Jie, Kirkland, WA (US); Giancarlo Devich, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/498,197

(22) Filed: Oct. 31, 2023

(51) Int. Cl.
*G06F 15/16* (2006.01)
*H04L 41/0604* (2022.01)
*H04L 41/0631* (2022.01)
*H04L 43/065* (2022.01)

(52) U.S. Cl.
CPC ...... *H04L 41/0636* (2013.01); *H04L 41/0604* (2013.01); *H04L 43/065* (2013.01)

(58) Field of Classification Search
CPC ........................ H04L 41/0636; H04L 41/0604; H04L 43/065
USPC .......................................................... 709/224
See application file for complete search history.

(56) References Cited

U.S. PATENT DOCUMENTS

| | | | | |
|---|---|---|---|---|
| 10,694,367 | B1* | 6/2020 | Sharma | H04L 67/535 |
| 11,609,704 | B2* | 3/2023 | Cady | G06F 11/3082 |
| 11,775,540 | B2* | 10/2023 | Wang | G06F 18/22 |
| | | | | 707/776 |
| 11,956,116 | B2* | 4/2024 | R | H04L 43/16 |
| 2022/0058042 | A1* | 2/2022 | Vanjare | G06F 9/45558 |
| 2023/0069593 | A1* | 3/2023 | Sherwood, Jr. | G06N 20/00 |
| 2023/0328080 | A1* | 10/2023 | Webster | H04L 43/022 |
| | | | | 726/23 |

* cited by examiner

*Primary Examiner* — Alicia Baturay
(74) *Attorney, Agent, or Firm* — Holzer Patel Drennan

(57) ABSTRACT

A disclosed method facilitates a computationally efficient way of identifying cohorts of telemetry point values that are statistically significant indicators of a computing event satisfying a condition of interest. The method includes computing Z-scores for the telemetry point values in an event-based dataset; identifying, based on the Z-scores, significant telemetry point values that are statistically significant indicators of the condition of interest; generating a significance-ordered prefix tree based on the significant telemetry point values and the Z-scores; using the significance-ordered prefix tree to identify cohorts to evaluate in combination; computing a cohort Z-score for each of the identified cohorts and identifying, based on the cohort Z-scores, a subset of the cohorts that are statistically significant indicators of the condition of interest.

20 Claims, 9 Drawing Sheets

SIGNIFICANCE ORDERED PREFIX TREE FOR COMPUTE-EFFICIENT ROOT CAUSE INVESTIGATION

BACKGROUND

Companies that provide cloud-based software services often devote significant human resources to investigating root cause factors that are responsible for problems such as customer-experienced technical difficulties or customer dissatisfaction with a particular product or service. In some cases where relatively little is known about the cause of a problem being investigated, root cause investigation entails collecting and analyzing large quantities of data in an effort to identify certain trends indicative of underlying factors that may have caused or contributed to the problem. For example, a technical support team may receive event logs from different devices on a network that include different telemetry point values captured in association with different types of compute events.

In the above types of systems, investigating the root cause of a condition of interest (e.g., the reason why a particular error code is being observed on customer platforms) typically entails an effort to identify telemetry point values that frequently appear in events satisfying the condition of interest. While it is possible to employ statistics to algorithmically identify combinations of telemetry point values that satisfy a correlation of particular strength (e.g., a "more than chance" correlation) with the condition of interest, existing algorithms are often cost-prohibitive in terms of computational overhead arising from the sheer number of possible significant combinations to explore. Notably, the number of possible telemetry value combinations in a given dataset increases exponentially in proportion to the number of different telemetry point values observed in a given dataset. Since it is computationally infeasible to rely on purely algorithmic approaches, most root cause investigation is driven, at least in part, by manual "guesswork" that is time consuming and inefficient.

SUMMARY

According to one implementation, a method is disclosed for identifying cohorts of telemetry point values that are statistically significant indicators of a computing event satisfying a condition of interest. The method includes computing Z-scores for a set of telemetry point values included in an event-based data set including telemetry data for multiple computing events; identifying, based on the Z-scores, significant telemetry point values that are statistically significant indicators of the condition of interest; and generating a significance-ordered prefix tree based on the significant telemetry point values and the Z-scores. The significance-ordered prefix tree has different hierarchical levels populated with nodes corresponding to the significant telemetry point values and edges connecting nodes storing pairs of the significant telemetry point values co-observed with respect to one or more events of multiple computing events. For each path of multiple different paths within the significance-ordered prefix tree, a cohort Z-score is computed for a cohort including the significant telemetry point values corresponding to nodes along the path. Based on the cohort Z-scores, a subset of the cohorts is identified as statistically significant indicators of the condition of interest.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
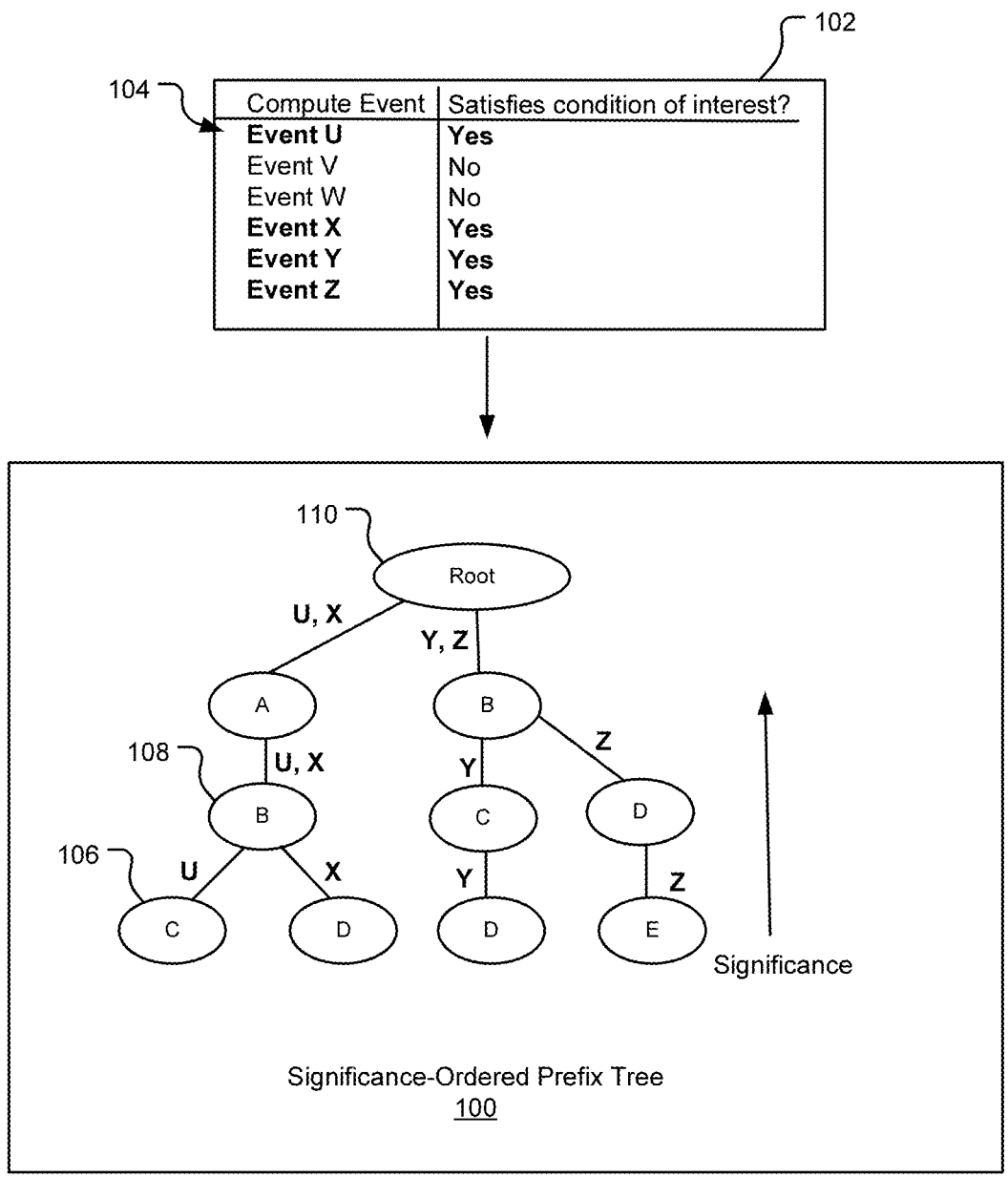
FIG. 1 illustrates example aspects of a significance-ordered prefix tree that is usable to computationally simplify the identification of significant cohorts in a root cause investigation.

The herein disclosed technology is designed to assist investigations that aim to discover the root cause of a condition of interest observed with respect to a compute event or a group of compute events. As used herein, a "condition of interest" refers to an observable characteristic of a compute event that a particular individual, team, or entity is motivated to better understand. For example, the condition of interest is an error code and a root cause investigation team is tasked with identifying reasons why the error code has been generated in a particular compute environment or why the error code is impacting a percentage of users of a particular software product. In this scenario, root cause investigation may entail debugging operations to identify the source of the error (e.g., within the code of a particular application) and/or factors contributing to observance of the error such as other software or hardware installed within the same compute environment. In other scenarios, the condition of interest is another type of performance metric, such as a latency statistic. For example, a root cause investigation team is tasked with identifying the source of a reported latency impacting a known percentage of users and/or compute events of a particular type. In still other scenarios, root cause investigation teams analyze compute event data to understand motivations for human behavior. For example, a root cause investigation team may be tasked with determining whether there exist observable compute event conditions that help to explain why certain users took a particular action, such as discontinuing a software product subscription or reporting dissatisfaction with a software product.

Some approaches to root cause investigation employ statistical calculations to identify observed telemetry point values that are statistically significant with respect to compute events that do and do not satisfy a condition of interest.

In large datasets that include tens or hundreds of telemetry points collected in association with different compute events, this single-value analysis is not always helpful. For example, this approach may lead to the identification of tens of observed telemetry point values as being statistically significant, leaving the developer with hundreds of possible combinations of such values to explore, each of which could suggest one or more different possible root causes of the condition of interest.

Mathematically, it is possible to apply similar statistics to identify significant cohorts—e.g., groups of values rather than just individual values—that have a significant relationship with a condition of interest that is satisfied by a subset of events in a dataset. However, practical implementation of these statistical approaches is generally cost-prohibitive in terms of compute processing for root cause investigation since the number of cohort combinations increases exponentially in proportion to the number of different telemetry point values observed in a given dataset. For example, a dataset with just 100 telemetry points that can each assume two different values has $100 \times (2^{100})$ possible cohorts. Since it is not feasible to computationally explore the potential significance of all cohorts of values that exist within a given set of event data, existing methods of root cause identification entail significant manual guesswork (sometimes in combination with algorithmic analysis), which is exceptionally inefficient and costly in terms of manpower and, in some cases, compute resources as well.

The herein disclosed technology provides a novel compute technique that drastically reduces computational overhead needed to perform root cause analysis on large datasets of telemetry values stored in association with compute events.

The disclosed techniques include data analysis and reduction operations that facilitate efficient identification of cohorts (e.g., co-appearing combinations) of telemetry point values in an event-based dataset that are, based on their respective frequency patterns (e.g., counts), statistically significant indicators of a co-occurring condition of interest.

As used herein the term "statistically significant" is used in accordance with the widely-accepted meaning in the field of statistics, and is thus a determination that the results in the data is unlikely to have occurred by chance alone. Statistical significance is defined in terms of p-value which is, as discussed below, readily convertible to other statistical scores such as "Z-score." In statistics, a p-value is a statistical measurement used to validate a hypothesis against observed data. The p-value is defined as the probability under the assumption of no effect or no difference (null hypothesis), of obtaining a result equal to or more extreme than what was actually observed in a given dataset. The "p" in p-value stands for "probability" and measures how likely it is that any observed difference between groups is due to chance. A p-value of 0.5 indicates a 50% confidence that an observed relationship between groups is "more than chance." P-values at or lower than 0.05 are generally considered to be statistically significant—meaning, the confidence in a "more than chance" relationship is at or higher than 95%.

In the following disclosure, the terms "significant telemetry point value" is used to refer to an individual telemetry point value that has been determined to have a "more than chance" correlation with a subset of events in a dataset satisfying a condition of interest by a predetermined confidence level (e.g., at least 95%). Likewise, the term "significant cohort" is used to refer to a collection of co-observed telemetry point values that has been determined to have a "more than chance" correlation with a subset of events in a dataset satisfying a condition of interest by a predetermined confidence level (e.g., 95%). A value or cohort is said to be a "significant indicator of a condition of interest" when the value or cohort has been identified as significant with respect to the condition of interest (e.g., identified as either a significant telemetry point value or as a significant cohort, as defined above). In one implementation, both the significant telemetry point values and the significant cohorts are characterized by p-values of at or less than 0.05.

Although there exists a range of measurements usable to derive the p-value of an observed relationship, the disclosed techniques utilize what is known as a Z-score calculated by a two-population Z-score test. The two-population Z-score test is used to determine whether two populations or groups differ significantly on some single characteristic. For example, this test can be used to determine whether a first group of events satisfying a condition of interest and a second group of events not satisfying the condition of interest differ significantly with respect to the likelihood of observing an individual telemetry point value or a cohort of telemetry point values. There exists a known static conversion between the two-population Z-score and the p-score. Consequently, a value or cohort can be identified as "significant" by using its respective Z-score to cross-reference a corresponding p-score in a universally-available look-up table.

According to one implementation, the disclosed techniques are performed by analyzing a dataset comprising values for a set of telemetry points observed in association with multiple computing events, some of which are known to satisfy a condition of interest and some of which are known to not satisfy the condition of interest. When applying the disclosed techniques, Z-scores are initially computed for individual telemetry point values. Based on the Z-scores, a subset of the observed telemetry point values are identified as being significant indicators of the condition of interest ("significant telemetry point values").

The significant telemetry point values are then used to construct what is referred to herein as a "significance-ordered prefix tree," the structure and purpose of which will be explored with respect to the following figures. While prefix trees (tries) are a common tool used to assist in search optimization, existing uses of prefix trees are different in purpose and function than the herein-disclosed "significance ordered prefix tree." A traditional prefix tree includes nodes that store values (usually strings) that appear in a dataset, with nodes being populated with strings based on the frequency by which those strings appear in the dataset. Rather than populating nodes based on the frequency with which their corresponding stored values appear in a dataset, the disclosed significance-ordered prefix tree includes nodes storing telemetry point values that are arranged (e.g., from top to bottom of the tree) based on a determined degree of significance (e.g., a Z-score) determined with respect to a given condition of interest. Nodes corresponding to co-occurring telemetry point values (e.g., values that appear concurrently with respect to one or more individual events) are interlinked by edges, and each "path" of edges on the tree links together a sequence of nodes storing telemetry values co-observed in association with one or more events. The node values stored along any path are arranged such that their respective Z-scores decrease as the path is traversed away from the root node of the tree.

The disclosed "significance-ordered prefix tree" is a data structure that, when populated and used as disclosed herein, facilitates straightforward identification of telemetry value cohorts that are most likely to be "significant cohorts" (e.g., as defined above) in relation to a defined condition of interest. The disclosed use of the significance-ordered prefix tree to identify combinations of cohorts to evaluate beneficially reduces computational overhead by eliminating significant numbers of potential cohorts from consideration, while at the same time facilitating accurate identification of the significant cohorts that are the strongest indicators of the condition of interest. Without the significance-ordered prefix tree, the total number of cohorts to evaluate is given by (N_events)×($2^M$) where N-events is the number of events in the dataset, and M is the number of telemetry points monitored with respect to each event. When using the significance-ordered prefix tree, the number of cohorts to evaluate is given by, at most, N_events×M. Provided that M (the number of telemetry points) is greater than 10, this translates to a 99% reduction in the number of cohorts to evaluate.

As such, the significance-ordered prefix tree is a computational tool that dramatically increases compute efficiency (e.g., reducing both the number of processing resources consumed and requisite processor compute time) when employed in the applications described herein, which pertain to root cause investigation on a large event-based dataset (e.g., comprising thousands of compute events) that includes telemetry point values collected in association with each of multiple compute events.

In an example root cause investigation that relies on a dataset including tens of telemetry points collected for hundreds of events, computing a Z-score for each and every combination of telemetry point values in the dataset is likely to take weeks using presently-available technology. In contrast, an algorithm relying on the disclosed significance-ordered prefix tree is capable of identifying the most significant combinations of telemetry point values in the dataset while computing Z-scores for only a small fraction of the total number of possibilities (e.g., 1% if there are more than 10 telemetry points collected for each event), thereby reducing total computation time from weeks to minutes or a few hours.

FIG. 1 illustrates example aspects of a significance-ordered prefix tree 100 that is usable to computationally simplify the identification of significant cohorts in a root cause investigation. The significance-ordered prefix tree 100 is constructed from a dataset 102 including compute events 104, each of which is known to either satisfy a condition of interest or not satisfy the condition of interest. Although not shown in FIG. 1, the dataset 102 includes, for each of the compute events 104, values for a set of telemetry points observed in association with one or multiple different customer compute platforms in a network. In various implementations, the compute events 104 can include any number of different event types that are individually observed within the computer platforms of one or more different devices on a computer network. For example, a "customer compute platform" may encompass one device, multiple devices, or portion(s) of such devices that are configured to perform compute operations on behalf of an individual customer. A customer computer platform may include personal devices, cloud devices, edge devices, or any combination thereof.

In some implementations, the dataset 102 includes sufficient data to support intrinsic determination of whether or not a given event satisfies the condition of interest. For example, the condition of interest may be a performance metric generated or observed by a device operating system, and the performance metric is itself included within one of the captured telemetry points. For example, the performance metric is an operating-system-generated error code, a latency observed higher than a defined threshold, or a number of glitches impacting a particular event. In other implementations, pre-processing is performed on the dataset 102 to determine whether or not each logged event satisfies the condition of interest. For example, the captured telemetry data includes a "customerID" field for a software product subscription, and a look-up table external to the dataset 102 is used to cross-reference customerID with information usable to assess the condition of interest. For example, the condition of interest is an observed user behavior such as customer use of a particular feature or a retention statistic (e.g., "customer has cancelled a subscription to this service") and the objective of this investigation is to identify factors, apparent in the telemetry data, that may have motivated the observed user behavior. For each different telemetry point value appearing within the dataset 102, a computation is performed to determine a significance of the value with respect to the subset of events that satisfy the condition of interest. In one implementation, this is achieved using the two-population Z-score, which is discussed further with respect to FIG. 2. Computation of the two-population Z-score (referred to herein as "the Z-score") for each value depends upon the entire dataset 102 (e.g., using counts that pertain to the events that satisfy the condition of interest and also counters pertaining to the events that do not satisfy the condition of interest). However, the significance-ordered prefix tree 100 is constructed exclusively from the event data pertaining to the events that do satisfy the condition of interest. In the illustrated example, this subset includes events U, X, Y, and Z.

The purpose of the significance-ordered prefix tree 100 is to organize data of the dataset 102 in a way that reduces the computational overhead needed to identify combinations of telemetry point values that are most likely to be "significant cohorts" (e.g., where the co-occurrence of values included in a significant cohort indicates a "more than chance likelihood," with a predefined level of certainty, that the associated computing event will satisfy the condition of interest).

The following description of the significance-ordered prefix tree 100 focuses on what each part of the tree corresponds to in the original dataset 102 and how that data is arranged within the tree. Notably, FIG. 3A-3E illustrate a detailed example methodology for creating this data arrangement.

In general, the significance-ordered prefix tree 100 is a tree-like structure with different hierarchical levels populated with nodes that each correspond to one or more observed instances of a select one of the significant telemetry point values. By example, the letters A-E are, in FIG. 1, intended to represent telemetry point values that have been identified individually (e.g., based on a respective computed Z-score) as being a significant indicator of the condition of interest within the dataset 102. Edges connect node values that were co-observed in one or more events. The tree consists of various paths, including "root-to-leaf" paths and, in some cases, one or more "root-to-branch" paths as well. A root-to-leaf path refers to a path of edges and nodes that begins at a root node 110 and that ends at a "leaf node," which is a node that does not have any child nodes. For example, node 106 is a leaf node. A root-to-branch path, in contrast, refers to a path of edges and nodes that begins at the root node 110 and that ends at a "branch node," where "branch node" refers to either (1) a node with more than one child node or (2) a node that has only one child node but that stores a count value that is larger than the count value of the one child node. For example, node 108 is a branch node because it has more than one child node. FIG. 1 does not show the count value stored in each node; however, an example of a branch node that fits the later description (e.g., storing a count value larger than that of its singular child node) is discussed with respect to FIG. 3F and node "C" in the FIG. 3F example.

Each path along the significance-ordered prefix tree 100 includes nodes storing telemetry point values that are co-observed in one or more events, with the nodes along each path being arranged in descending order of significance such that the Z-scores of the associated stored telemetry point values decrease when tracing any individual path down the tree.

The significance-ordered prefix tree 100 is constructed from the subset of events in the dataset 102 that satisfy the condition of interest—namely, events U, X, Y, and Z (with events V and W being excluded from the tree because these do not satisfy the condition of interest). Each of events U, X, Y, and Z is characterized by a different combination of the telemetry values A, B, C, D, and E, each of which were determined to be individually significant in relation to a condition of interest based on a two-population Z-score ("the z-scsore"). For example, A, B, and C were individually determined to be significant and also were co-observed during event U while B, D, and E were individually determined to be significant and were also co-observed during event Z.

By example, edges of the tree are annotated with letters corresponding to one of the events U, X, Y, and Z. Tracing the Event U edges (annotated "U") from top to bottom of the tree follows a path that sequentially intersects nodes A, B, and C (the "event path" for event U), which are the significant telemetry values identified for event U. Likewise, tracing the Event X edge (annotated "X") edges from top to bottom of the tree follows a path that sequentially intersects nodes A, B, and D, which represent the significant telemetry values identified for event X. The nodes are ordered top-to-bottom as shown because the Z-score of A is greater than the Z-score of B, and the Z-score of B is greater than the Z-score of either of C and D. Notably, event U and event X follow the same event path through nodes A and B (e.g., since A and B were both observed in event U and event X), however, the commonality ends at node B which is a branch node connecting to nodes C and D. Notably, the value stored in node C was observed in event U but not event X, and the value stored in node D was observed in event X and not event U.

Per the above-described convention, the significance-ordered prefix tree 100 also includes an event path for event Y that intersects nodes B, C, and D (the significant telemetry values for event Y) and an event path for event Z that intersects nodes B, D, E (the significant telemetry values for event Z), with the illustrated hierarchical arrangement indicating that the Z-score of B is greater than C and D, the Z-score of C is greater than D, and the Z-score of D is greater than E.

By looking at the significance-ordered prefix-ordered tree 100, it can be observed that "A" was the most significant telemetry value observed for some events while "B" was the most significant telemetry value observed for other events (where "significance" is measured in terms of the Z-score discussed above). A general understanding of the relative significance of a telemetry point value within an individual event (compared to other values collected for the same event) can be visually extracted from the tree node by looking at the placement of each node along its respective root-to-leaf path. The locations of various node-to-node connections within the hierarchical levels of the tree conveys a general sense of the frequency with which different cohorts of values appear together. It should be noted that this co-appearance frequency is mathematically related to (but not necessarily proportional to) the significance of these cohorts with respect to the condition of interest.

Using the significance-ordered prefix-ordered tree 100 it is simple to identify subsets of cohorts (co-appearing values) that have the highest overall likelihood of being significant indicators of the event of interest. These cohorts are referred to herein as "potentially significant cohorts." According to one implementation, the potentially significant cohorts include a cohort corresponding to each root-to-leaf path and each root-to-branch path in the significance-ordered prefix tree 100. For example, the root-to-leaf paths in the significance-ordered prefix tree 100 include ABC, ABD, BCD, and BDE. Likewise, the root-to-branch paths in the significance-ordered prefix tree 100 include B and AB. Therefore, the collection of potentially significant cohorts includes AB, ABC, ABD, BCD, and BDE (where B can be excluded from analysis because its individual significance was determined prior to construction of the significance-ordered prefix tree). This collection of potentially significant cohorts represents the exhaustive set of the cohorts that are mathematically assessed from the dataset 102.

Once these potentially-significant cohorts are identified, a Z-score is computed for each potentially significant cohort, and a subset of the potentially significant cohorts are identified, based on their respective Z-scores, as "significant cohorts." These significant cohorts are, in turn, passed on to the root cause investigation team.

In some cases, root cause identification ends when significant cohorts are identified. For example, a debugging team may—based on developer expertise and company-internal knowledge—be immediately apprised of the cause of an observed error code when provided with significant cohorts that, for example, identify a particular driver version installed in association with a particular operating system on a subset of machines having a particular hardware component.

In other implementations, the identification of significant cohorts expedites and facilitates further troubleshooting that, in turn, leads to root cause discovery. For example, a developer may use the identified significant cohorts to identify a particular compute environment in which an error is most likely to be observed. Using this information, the developer can then easily reconstruct an environment where the error can be replicated and, if necessary, conduct further troubleshooting within such environment until enough information is known to implement a technical solution to the problem, such as by releasing a software patch. Alternatively, a debugger may utilize an identified group of significant telemetry value cohorts to guide selection of additional telemetry points potentially valuable to a given investigation. If, for example, initial analysis efforts leads to identification of significant cohorts tending to indicate a correlation between a particular error code and a particular computing endpoint in a network, the debugger may use this information to identify additional telemetry points that may be useful (e.g., related to the health of the endpoint) and repeat the data collection and cohort analysis on a new dataset that includes additional telemetry points.

In various implementations, the significant cohorts are used to inform forward-looking decisions and root cause corrective actions, which can vary depending upon the nature of the condition of interest. If, for example, it is determined that an error code is disproportionately affecting user systems executing a particular driver with a particular hardware component, this information can be used to build a test environment for replicating the error and developing a suitable software patch. Alternatively, if the condition of interest is a user behavior observed in association with a particular software product, the identification of significant cohorts can provide valuable context that helps to explain reasons for the user behavior and help the provider of the software product determine how to best serve its customer base. If, for example, it is determined that a significant portion of users discontinuing subscriptions for a particular software tool are also subject to frequent errors and latencies while using the tool, the provider of the tool may, based on this information, elect to redirect internal funds toward fixing problems with the tool in lieu of developing and releasing a new product.

Figure 2:
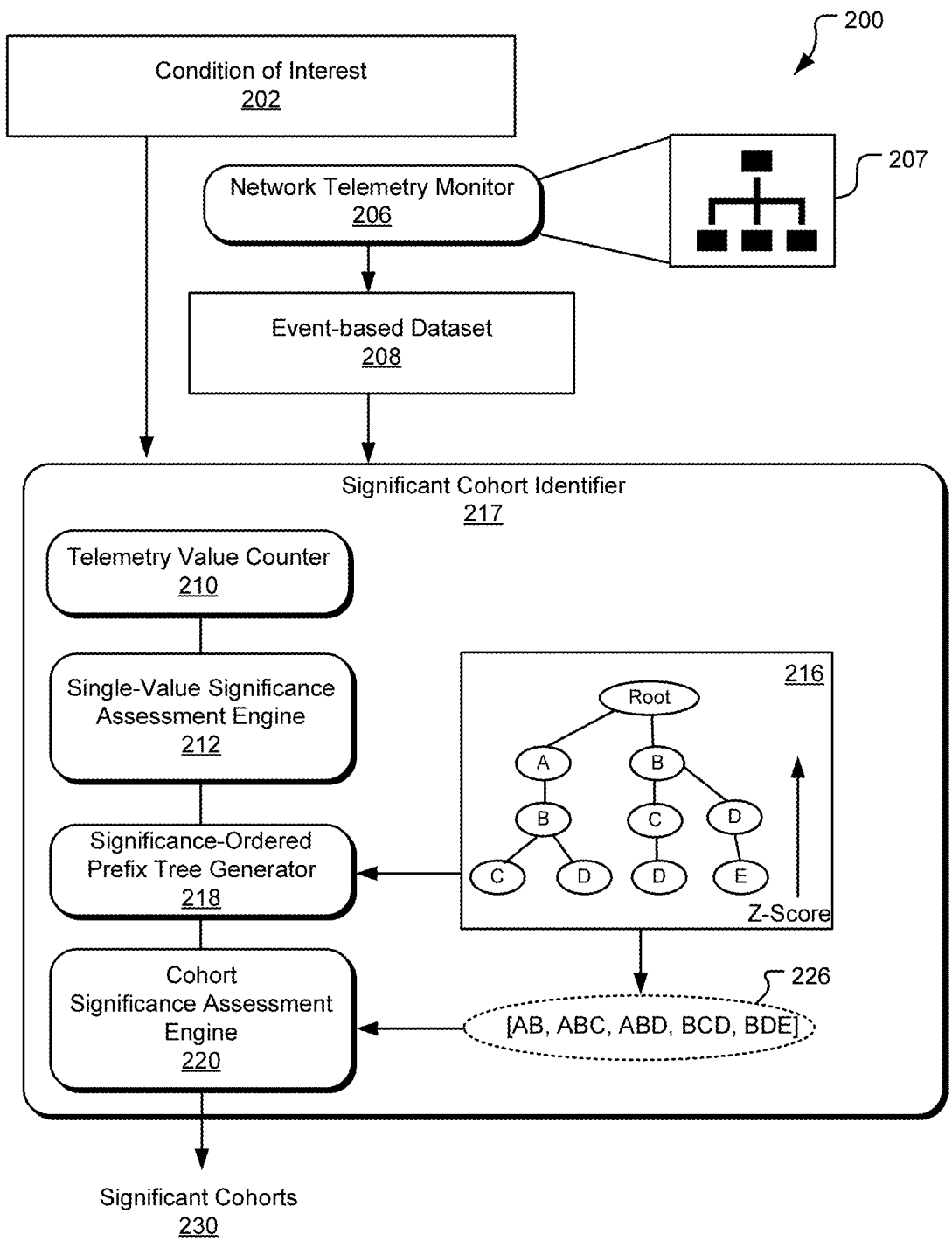
FIG. 2 illustrates an example root cause investigation system that implements a significant cohort identifier to identify combinations of telemetry values that are significant indicators of a condition of interest being satisfied by a given event in a dataset.

FIG. 2 illustrates an example root cause investigation system 200 that implements a significant cohort identifier 217 to identify combinations of telemetry values that are significant indicators of a condition of interest being satisfied by a given event in a dataset. The system 200 includes a network telemetry monitor 206 that monitors a network 207 and that collects, for one or more predefined types of network events, values of a defined set of telemetry points. This collected event data is referred to as event-based dataset 208. In the illustrated implementation, the event-based dataset 208 includes events that are observed on different devices within a network.

As input, the significant cohort identifier 217 receives, from a user or requesting application, the event-based dataset 208 as well as an indicator defining the condition of interest 202 (e.g., "event error code=1234"). In this implementation, it is assumed that the event-based dataset 208 includes sufficient information to support intrinsic assessment, by the significant cohort identifier 217, of the condition of interest with respect to each different event. In other implementations, the assessment of whether or not each different event satisfies the condition of interest is performed by an entity external to the system 200, and the inputs to the significant cohort identifier 217 include data indicating which events in the event-based dataset 208 satisfy the condition of interest.

The significant cohort identifier 217 includes a telemetry counter 210 that counts the number of times that each different telemetry point value appears in the event-based dataset 208. Notably, the term "telemetry point value" is intended to refer to both a telemetry point field and an observed value for the field. For example, telemetry point fields may include "date" and "IHV" (independent hardware vendor) with corresponding values "08232023" and "Intel®," respectively. In this example, "date=08232023" is a first telemetry point value and "IHV=Intel®" is a second telemetry point value. If, for example, the telemetry point value "date=08242023" appears in association with 2000 events in the event-based dataset 208, the telemetry counter 210 stores the count value of "2000" in association with "date=08242023." This count is repeated for each different telemetry point value that appears within the event-based dataset 208. The telemetry counter 210 also determines the total number of events in the event-based dataset 208, the total number of events in the dataset that satisfy condition of interest, as well as the number of times that each of the different telemetry point values satisfies the condition of interest.

The counts determined by the telemetry counter 210 are provided to a single-value significance engine 212 that, in turn, computes a Z-score for each one of the counted telemetry point values. The Z-score for a telemetry point value indicates whether the telemetry point value is or is not a significant indicator of the condition of interest (e.g., whether the telemetry point value is a "significant telemetry point value", as defined elsewhere herein). In the system 200, the Z-score is computed using a two-population Z-test, given by equation 1, below:

$$Z = \frac{(\overline{p}_1 - \overline{p}_2) - 0}{\sqrt{\overline{p}(1 - \overline{p}) * \left(\frac{1}{n_1} + \frac{1}{n_2}\right)}} \tag{1}$$

where:
$n_1$ is the number of events in the event-based dataset 208 that include the telemetry point value;
$n_2$ is the total number of events in the event-based dataset 208;
$p_1$ is a fraction having a denominator equal to $n_1$ and a numerator representing a number of events in the event-based dataset 208 that both include the telemetry point value and that also satisfy the condition of interest; and
$p_2$ is a fraction having a denominator equal to $n_2$ and a numerator representing a total number of events in the dataset that satisfy the condition of interest.

By accepted statistical conversion, a Z-score of 2.06 corresponds to a p-value of less than 0.02—meaning, there is a 98% confidence in a "more than chance" relationship between the value and the condition of interest. In one implementation, a p-value of 0.02 is predefined as being statistically significant and any telemetry point value with a Z-score greater than 2.06 is identified as a statistically significant indicator of the condition of interest. In other implementations, a p-value of 0.05 is predefined as being statistically significant. In other implementations, a statistically significant indicator of the condition of in interest is a value or cohort with a Z-score corresponding to any p-value of less than 0.05.

Once Z-scores are determined for individual telemetry point values in the event-based dataset 208, a subset of the telemetry values are identified based on their Z-scores (e.g., those with Z-scores greater than 2.06) as being "significant telemetry point values."

Following this, a significance-ordered prefix tree constructor 218 constructs a significance-ordered prefixed tree 216 based on the Z-scores and the event-based dataset. In one implementation, the significance-ordered prefix tree constructor 218 is constructed from a modified version of the event-based dataset that (1) excludes all events that do not satisfy the condition of interest and that (2) excludes all telemetry point values that are not identified significant telemetry point values. The modified dataset therefore consists of event data for the subset of events satisfying the condition of interest, where the data of each event consists of a subset of the significant telemetry point value(s) observed during the event. Excluding non-significant values from the dataset that is used to construct the significance-ordered prefixed tree 216 significantly reduces the number of nodes included on the tree and the number of cohorts that are ultimately analyzed (per operations described with respect to cohort significant assessment engine 220) as being potentially significant. The magnitude of the resulting reduction in the total number of cohorts to evaluate varies based on the size of the dataset; however, the exclusion of the non-significant values from the significance-ordered prefix tree has the effect of eliminating more than 75% of total cohorts to evaluate when there are more than 10 telemetry points to analyze for each different event included in the dataset.

The significance-ordered prefix tree 216 includes characteristics that are the same or similar to those described with respect to FIG. 1 including different hierarchical levels populated with nodes that each correspond to one or more instances of a select one of the significant telemetry point values. Edges link together pairs of the significant telemetry point values that are co-observed with respect to one or more events in the event-based dataset 208. Along each path within the tree, nodes are arranged in order of decreasing Z-score. Additional characteristics of the significance-ordered prefix tree 216 are assumed to be similar those described elsewhere herein, such as with respect to either FIG. 1 or the examples set forth in FIG. 3A-3F.

Once the significance-ordered prefix tree 216 is constructed from the events satisfying the condition of interest and their respective significant telemetry values, a cohort significance assessment engine 220 identifies and mathematically evaluates a collection of potentially significant cohorts 226. In one implementation, each of the potentially significant cohorts 226 corresponds to a different root-to-leaf path or root-to-branch path on the significance-ordered prefix tree 216. For example, each root-to-leaf path is identified (e.g., from the root node to a childless "leaf" node), each root-to-branch path is identified (e.g., from the root node to each node with more than one child or that have one child but that store a count value that is greater than the count value stored in the one child), and a cohort is identified for each of these paths, where the cohort consists of the significant telemetry point values stored in nodes along the path. The collection of cohorts corresponding to the root-to-leaf paths and root-to-branch paths represent the potentially significant cohorts. Additionally, evaluating only the root-to-leaf paths and the root-to-branch paths reduces overhead as compared to the overhead needed to evaluate all root-to-node paths on the tree. In one test case with 256 GB of data analyzed, 75% of the nodes had a single child, so this technique had the effect of reducing overhead pertaining to cohort Z-score computation by 75%.

The cohort significance assessment engine 220 computes a cohort Z-score for each of the potentially significant cohorts. According to one implementation, the cohort Z-score is computed using the same general formula as above in equation 1 except that the counts pertaining to the "telemetry point value" are replaced by counts pertaining to the cohort. Specifically, equation (1) (above) is evaluated again, except that for the cohort-specific analysis:

$n_1$ is the number of events in the event-based dataset 208 that include the telemetry point cohort; and $p_1$ is a fraction having a denominator equal to $n_1$ and a numerator representing a number of events in the event-based dataset 208 that both include the telemetry point cohort and that also satisfy the condition of interest.

Values of $n_2$ and $p_2$ are the same as defined within the discussion of equation (1), above.

Per the above operations, the cohort significance assessment engine 220 determines a Z-score of each potentially significant cohort and, based on these cohort-specific Z-scores, identifies a subset of the potentially significant cohorts 226 including cohorts that are, in fact, "significant cohorts 230" (e.g., statistically significant indicators of the condition of interest). In one implementation, this analysis is substantially identical to that described above with respect to identification of the significant telemetry point values by the single-value significance assessment engine 212.

The significant cohorts 230 are output to the application or user that placed the request to the significant cohort identifier 217. The significant cohort 230 are then, in some implementations, provided to a root cause investigation system or team that uses the significant cohorts to pinpoint the root cause of the condition of interest. In some implementations, the root cause is immediately apparent from the identified significant cohorts and no further root cause analysis is needed. If for example, root cause investigation pertains to "why are customers discontinuing subscriptions to this software product" then the root cause of this condition may be self-evident from identified significant cohorts that are indicative of various technical glitches, latencies, etc.—that is, these identified technical problems caused the customer to discontinue the subscription. In other implementations, technical teams may utilize the significant cohorts 230 to identify new telemetry points of interest, collect further data including the new telemetry points, and repeat the above-described analysis to identify further significant cohorts that may, in turn, be indicative of the root cause for the condition of interest. In either scenario, the root cause is identified more expeditiously than that typical in investigation practices that do not utilize the significance-ordered prefix tree 216 and while consuming significantly fewer compute resources.

FIGS. 3A-3F provide another set of detailed example operations for building and using a significance-ordered prefix tree to reduce computational overhead in identifying significant cohorts for a condition of interest.

Figure 3A:
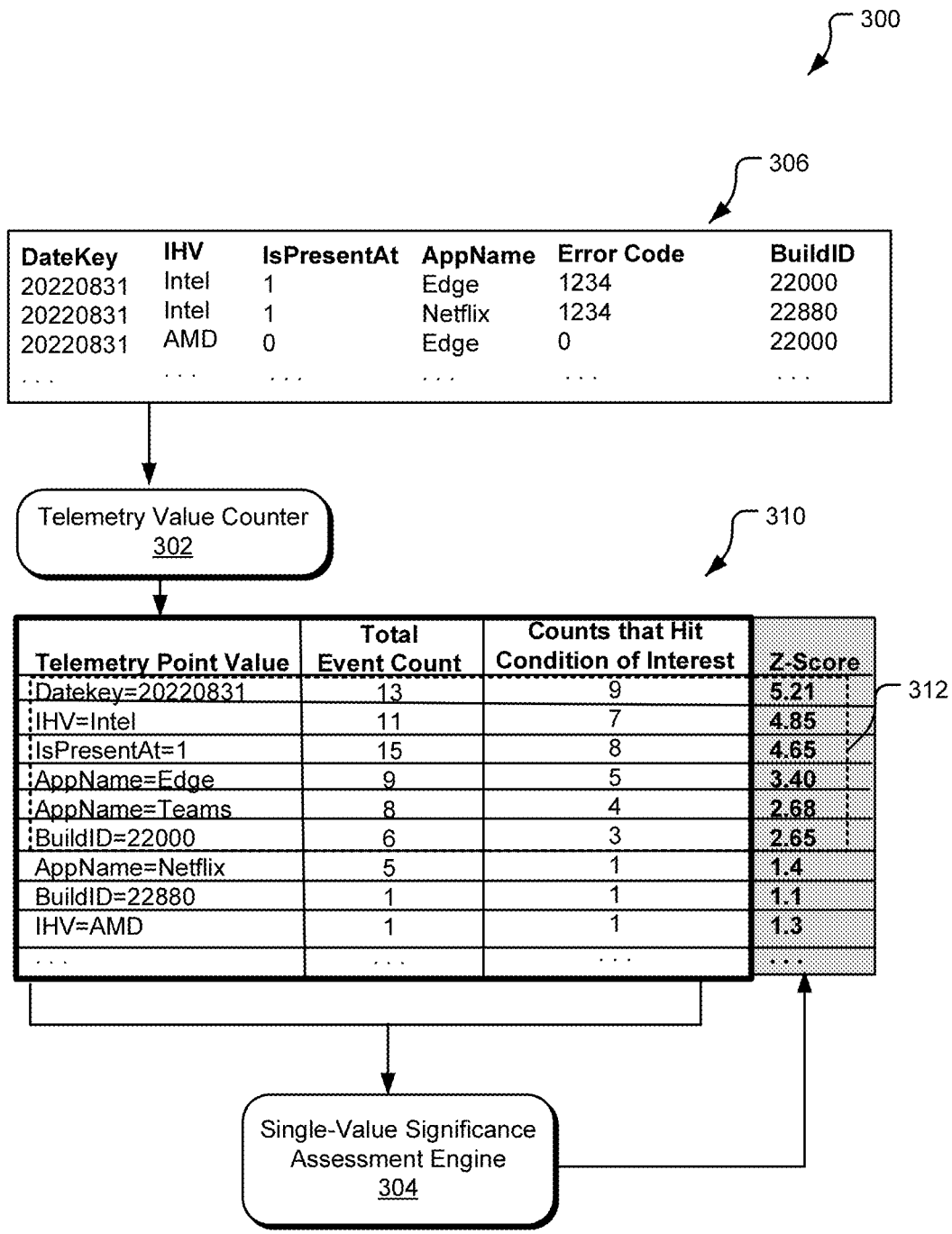
FIG. 3A illustrates a first set of example operations performed by a root investigation system for acquiring information utilized in constructing a significance-ordered prefix tree.

Specifically, FIG. 3A illustrates a first set of example operations performed by a root investigation system 300 for acquiring information utilized in constructing a significance-ordered prefix tree. The root cause investigation system 300 includes a telemetry value counter 302 and a single-value significance assessment engine 304, each of which perform operations the same or similar to those discussed with respect to like-named components in FIG. 2.

An example event-based dataset 306 is provided as input to the telemetry value counter 302. In FIG. 3A, the event-based dataset 306 is shown to include multiple columns and rows. Each row represents data from a different compute event. Each column represents a telemetry point (also referred to herein as a telemetry field). Depending upon the implementation, the events (rows) shown in the event-based dataset 306 may correspond to the same or different types of events that occur on different devices.

For example, an event may be an application launch event, an application termination event, the start or end of an operation initiated by an application or by a device operating system, an alteration to a hardware component state, an event observed by a device (e.g., traffic is received having certain characteristics), an error code experienced by an application or the device operating system, and more. For each of these detected or reported events, values are logged for a same set of telemetry points observed across many different devices. Notably, observing common event type(s) across thousands or millions of different devices can be informative when identifying telemetry point value(s) that are significant indicators of a condition of interest. If, for example, a particular error code (e.g., event type) is observed on 50% of devices in the event-based dataset 306 and the error code is being observed on 70% of the devices with a particular device characteristic (e.g., having Intel®-manufactured hardware), the particular device characteristic can be identified as a significant indicator of the condition of interest.

In the example shown, there are six telemetry points logged for each event (e.g., DateKey, IHV, IsPresentAt, AppName, ErrorCode, BuildID); however, in actual implementations of the disclosed technology, the event-based dataset 306 includes thousands or millions of events and the number of telemetry points logged and stored in connection with each event may be in the tens, hundreds, or even thousands (e.g., a number high enough that would take several days or weeks to compute the Z-score for all cohort combinations of the telemetry point values appearing in the event-based dataset 306 using presently-existing technology).

The telemetry value counter 302 also receives information usable to identify a first subset of the events in the event-based dataset 306 that satisfy a condition of interest and a second subset of the events in the event-based dataset 306 that do not satisfy the condition of interest. In the illustrated example, the condition of interest is an error code with unknown cause. The condition of interest is satisfied for an event when the event includes the telemetry point value 'ErrorCode=1234.'

The telemetry value counter 302 identifies each different telemetry point value that appears in the event-based dataset 306 and, for each of the different telemetry point values, counts (1) the total number of events that include the telemetry point value; and (2) the number of events that include the telemetry point value and that also satisfy the condition of interest (e.g., that have the telemetry value "ErrorCode=1234"). This information (shown generally in table 310) is provided as input to the single-value significance assessment engine 304 which, in turn, uses these counts to compute a Z-score (e.g., using equation 1, above) for each different telemetry point value, where the Z-score of a telemetry point value is generally indicative of the probability of a "more than chance" relationship between the telemetry point value and the condition of interest, with a threshold level of certainty.

Example Z-scores are shown in the far-right column of the table 310. From the Z-scores, a subset of the telemetry point values are identified as significant telemetry point values 312 (e.g., the telemetry point values with Z-scores greater than 2.06, as discussed elsewhere with respect to FIG. 2).

Figure 3B:
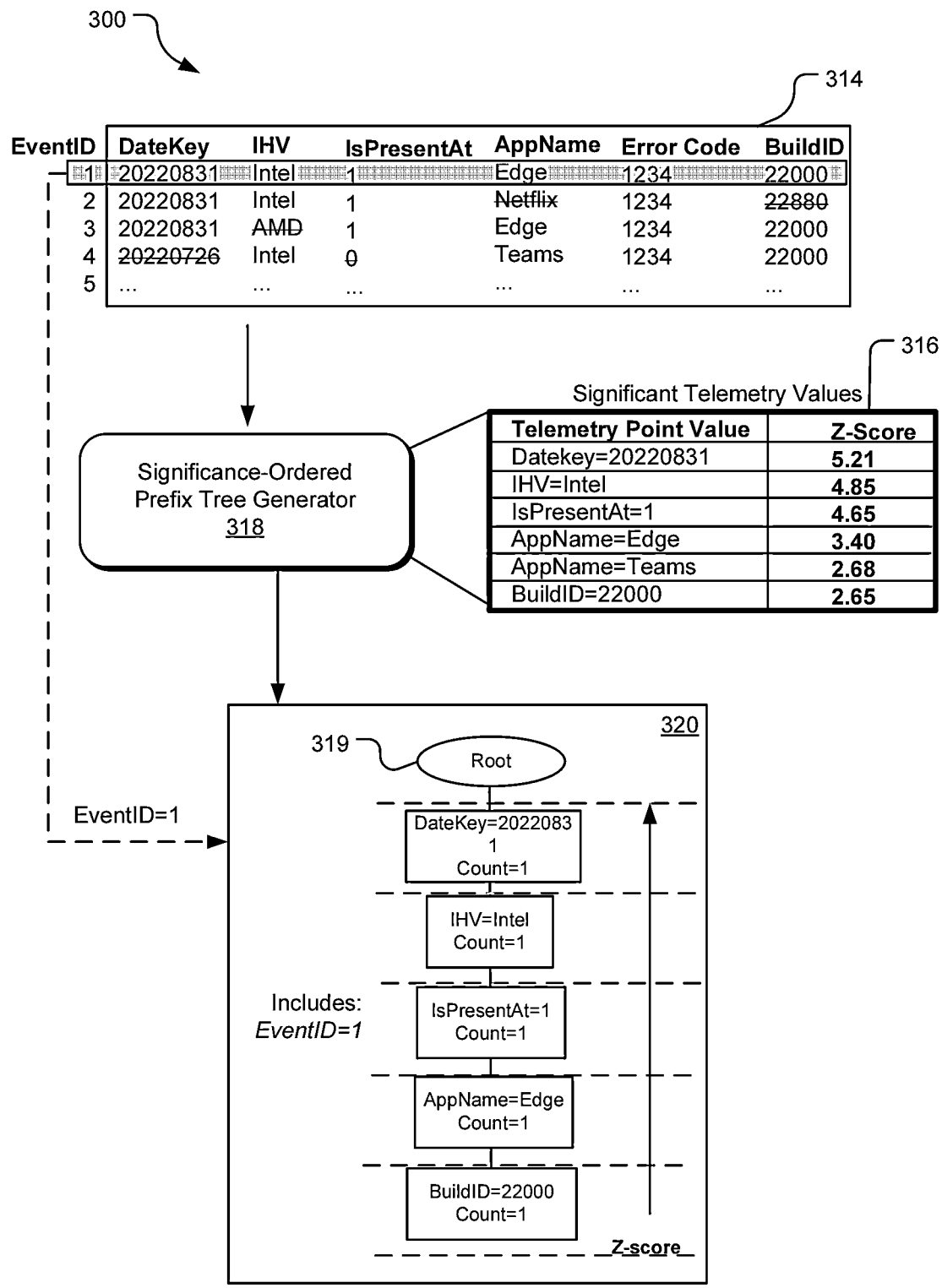
FIG. 3B illustrates additional example operations of the root cause investigation system performed following the operations described above with respect to FIG. 3A.

FIG. 3B illustrates additional example operations of the root cause investigation system 300 performed following the operations described above with respect to FIG. 3A.

After identifying significant telemetry point values as explained above, the event-based dataset is modified to exclude (1) events that do not satisfy the condition of interest and (2) telemetry point values that are not included in the significant telemetry point values. By example, FIG. 3B shows a table 314 that includes the event-based dataset 306 of FIG. 3A modified in this way. The table 314 includes the events satisfying the condition of interest ("Error-Code=1234") and excludes those that do not. Within the table 314, strike-through text is used to denote telemetry point values for these events that were not identified as being significant telemetry point values (e.g., IHV=AMD®; AppName=Netflix®; and BuildID=22880). The insignificant telemetry point values are ignored when populating a significance-ordered prefix tree, as described below.

FIG. 3B includes another table 316 which stores the Z-scores previously computed for each of the significant telemetry point values (e.g., the Z-scores computed by the single-value significance assessment engine of 304 of FIG. 3A). Using the information in the table 314 and the table 316, a significance-ordered prefix tree generator 318 begins to populate a significance-ordered prefix tree 320. Population of the significance-ordered prefix tree 320 is performed one event at a time. In FIG. 3B, the significance-ordered prefix tree 320 is shown populated with data from a first event (EventID=1) in the table 314.

Before adding the telemetry point values of the first event (EventID=1) to the significance-ordered prefix tree 320, the telemetry point values of the event are ranked from highest to lowest Z-score. The significant telemetry point values for EventID=1 include DateKey=20220831; IHV=Intel®; IsPresentAt=1 AppName=Edge®, ErrorCode=1234, and BuildID=22000. Notably, the telemetry field "Error-Code=1234" in the table 314 indicates the condition of interest being investigated and is therefore not a significant telemetry point value. Starting at a root node 319, a node is added at each descending hierarchical level of the significance-ordered prefix tree 320 until the number of nodes equals the number of significant telemetry values for the first event (EventID=1). These nodes are connected with edges and populated with the significant telemetry point values for the first event in order of decreasing Z-score with increasing distance away from the root node 319 of the tree, as shown. Each node is initialized with a count value of "1."

Figure 3C:
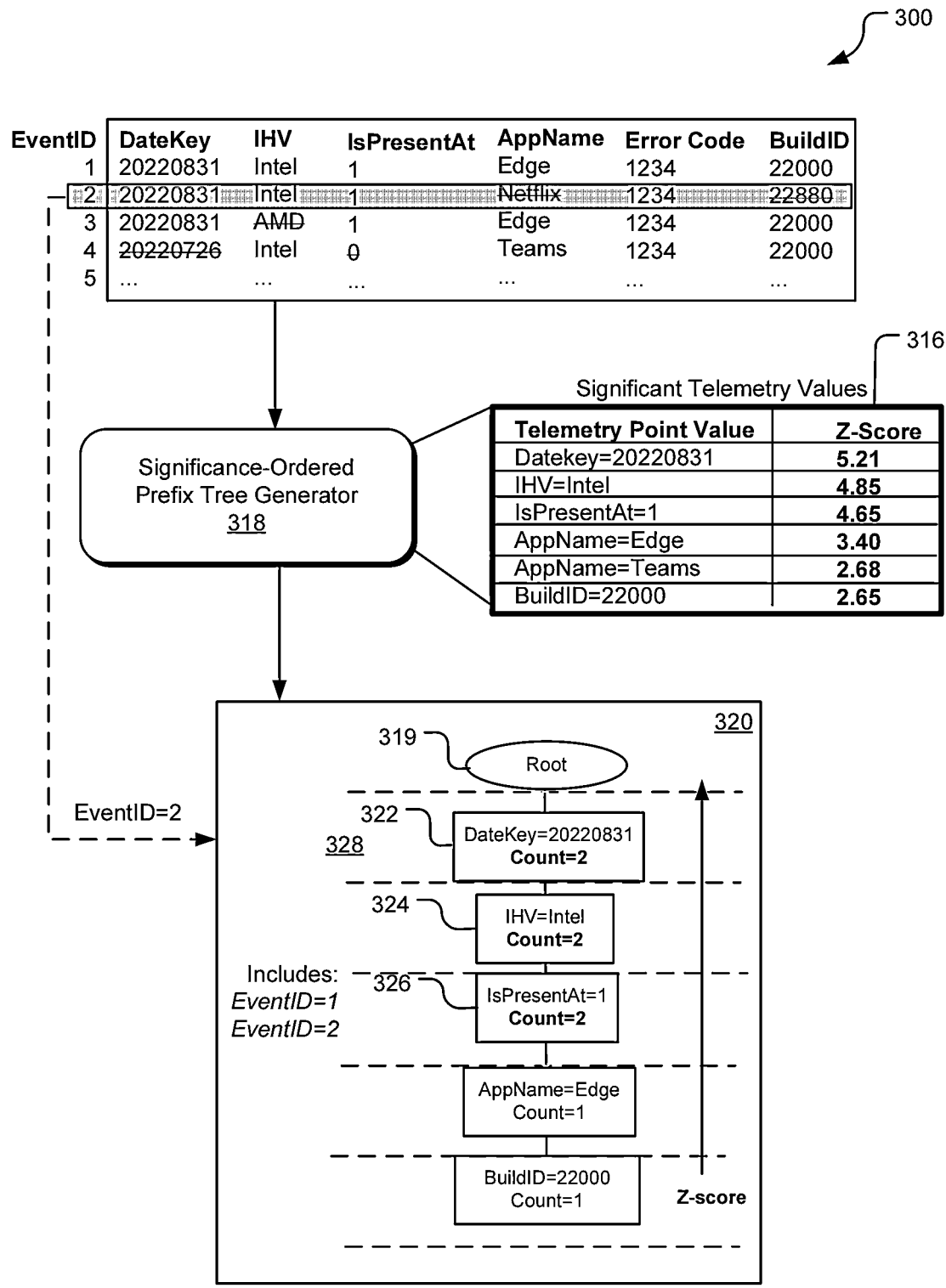
FIG. 3C illustrates additional example operations performed by the system following those described above with respect to FIG. 3B.

FIG. 3C illustrates additional example operations performed by the system 300 following those described above with respect to FIG. 3B. Here, the telemetry point values of the second event (EventID=2) are added to nodes of the significance-ordered prefix tree 320. First, a Z-score ordered sequence of the significant telemetry values is determined for the event. In this case, the Z-score ordered sequence of significant telemetry point values for EventID=2 is (in order of decreasing Z-score) is: DateKey=20220831, IHV=Intel®; and IsPresentAt=1. Note, the telemetry point values "AppName=Netflix®" and "BuildID=22880" are excluded from this sequence because they were not identified as significant.

One by one, these three values are added to the significance-ordered prefix tree 320. First, it is determined whether a highest level 328 of the hierarchical tree already includes a node storing the first telemetry point value in the Z-score ordered sequence for the event (DateKey=20220831). If so, the count value of this existing node is incremented. In this case, the highest level 328 does already include the node 322 storing the first telemetry point value (DateKey=20220831) that appears in the Z-score ordered sequence of significant values for EventID=2. Consequently, the count value of node 322 is incremented from one to two. If, in another scenario, the first telemetry point value in the sequence was not already stored in a node on the highest level of the tree, a new node would be added at this highest level 328 and connected to the root node 319.

For each subsequent value at index "N" in the Z-score ordered sequence for EventID=2 (e.g., the full sequence being: DateKey=20220831, IHV=Intel®), and IsPresentAt=1), it is determined whether a last-updated node in the significance-ordered prefix tree 320 already has a child node storing the value at index N in the sequence. If so, a count value of the already-existing child node is updated. If, however, the last-updated node in the significance-ordered prefix tree 320 does not yet include a child node storing the value at index "N" in the Z-score ordered sequence for the event, a new child node is created for the last-updated node and the new child new is populated with the value and given a counter initialized to 1.

For the N=2 (second) index in the Z-score ordered sequence for eventID=2, the last-updated node is identified as the node 322. In this case, the last-updated node does already have a child node storing the N=2 index value in the EventID=2 sequence ("IHV=Intel"). This existing child node is node 324. Consequently, the counter is updated in node 324 (from 1 to 2), and the logic is repeated for the N=3 (third) index in the Z-score ordered sequence.

The N=3(third) index in the Z-score ordered sequence for eventID=3 stores a value of "IsPresentAt=1"). This time, the last-updated node is node 324 and node 324 already has a child node storing the value "IsPresentAt=1" (e.g., in node 326). Consequently, the counter is incremented from 1 to 2 for the node 326.

Figure 3D:
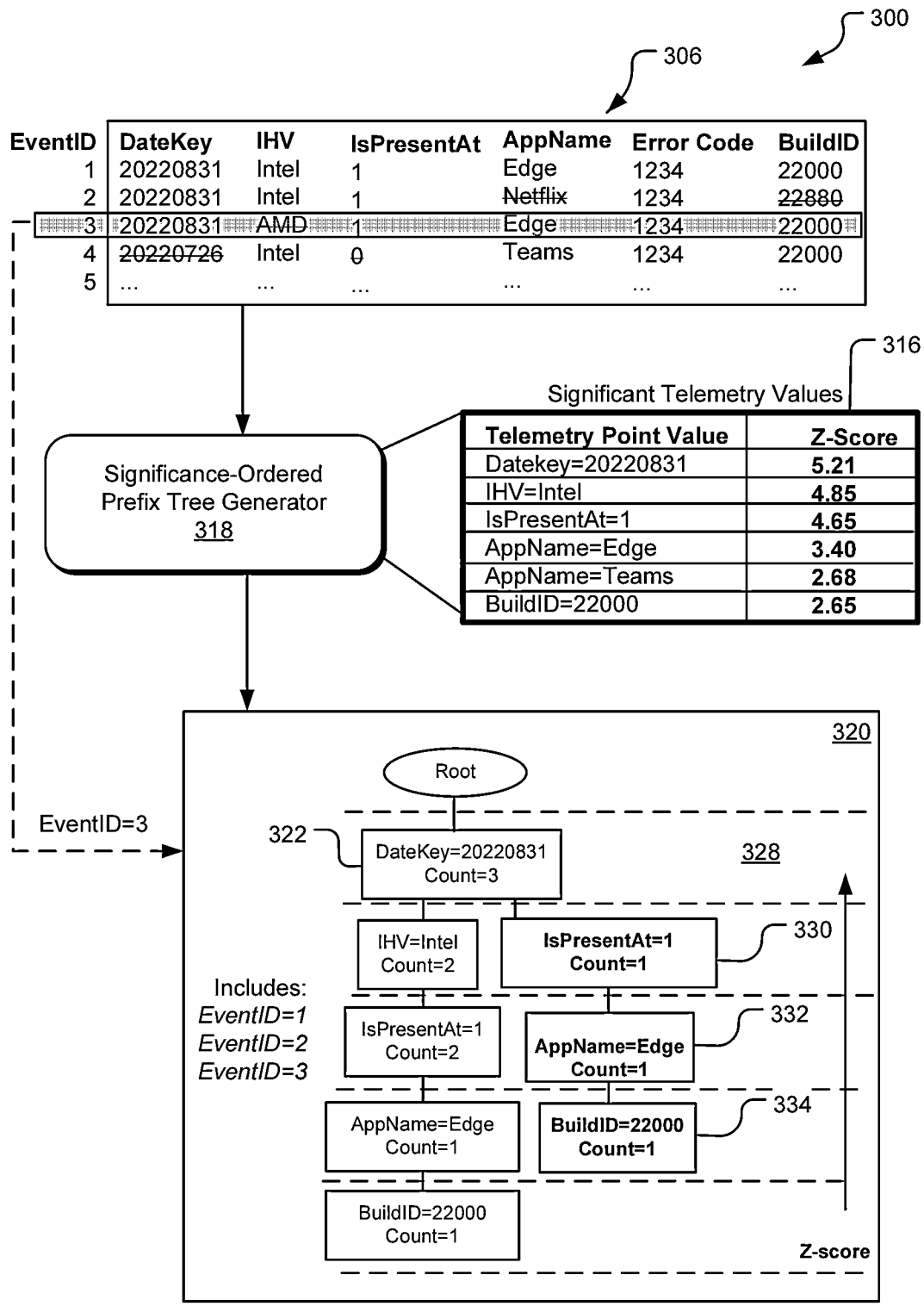
FIG. 3D illustrates additional example operations for populating a significance-ordered prefix tree performed by the system following those described above with respect to FIG. 3C.

FIG. 3D illustrates additional example operations for populating a significance-ordered prefix tree performed by the system 300 following those described above with respect to FIG. 3C. Here, the telemetry point values of the third event (EventID=3) are added to nodes of the significance-ordered prefix tree 320 in order of decreasing Z-score from the top to the bottom of the tree. The Z-score ordered sequence of significant telemetry point values for EventID=3 includes: DateKey=20220831, IsPresentAt=1, AppName=Edge®, and BuildID=22000.

These values are added to the significance-ordered tree one-by-one, per identical logic to that described above. For the first telemetry point value in this sequence (DateKey=20220831), it is first determined whether a highest level 328 of the hierarchical tree already includes a node storing the first telemetry point value. If so, the count value of this existing node is incremented. In this case, the highest level 328 does already include the node 322 storing the first telemetry point value (DateKey=20220831) for the EventID=3 sequence. Consequently, the count value of node 322 is incremented from two to three. If, in another scenario, the first telemetry point value in the sequence was not already stored in a node on the highest level of the tree, a new node would be added at this highest level 328 and connected to the root node.

For each subsequent value at index "N" in the Z-score ordered sequence for EventID=3, it is determined whether a last-updated node in the significance-ordered prefix tree 320 already has a child node storing the value at index N in the sequence. If so, a count value of the already-existing child node is updated. If, however, the last-updated node in the significance-ordered prefix tree 320 does not yet include a child node storing the value at index "N" in the Z-score ordered sequence, a new child node is created for the last-updated node and the new child new is populated with the value and given a counter initialized to 1.

Applying the above logic to present example: the second value in the Z-score ordered sequence for EventID=3 is identified (e.g., IsPresentAt=1). It is determined that this node does not yet have a child node storing the second value; consequently, the last-updated node 322 is given a new child node 330 that stores IsPresentAt=1 and that has a counter initialized at 1.

The third value in the Z-score ordered sequence for EventID=3 is AppName=Edge®). At this point in time, the last-updated node is 330 and it is determined that node 330 does not yet have a child node storing the third value in the sequence (AppName=Edge®). Consequently, the last-updated node 330 is given a new child node 332 that stores AppName=Edge® and that has a counter initialized at 1.

The fourth value in the Z-score ordered sequence for EventID=3 is BuildID=22000. At this point in time, the last-updated node is 332 and it is determined that node 332 does not yet have a child node storing the third value in the sequence (BuildID=22000). Consequently, the last-updated node 332 is given a new child node 334 that stores BuildID=22000 and that has a counter initialized at 1.

Figure 3E:
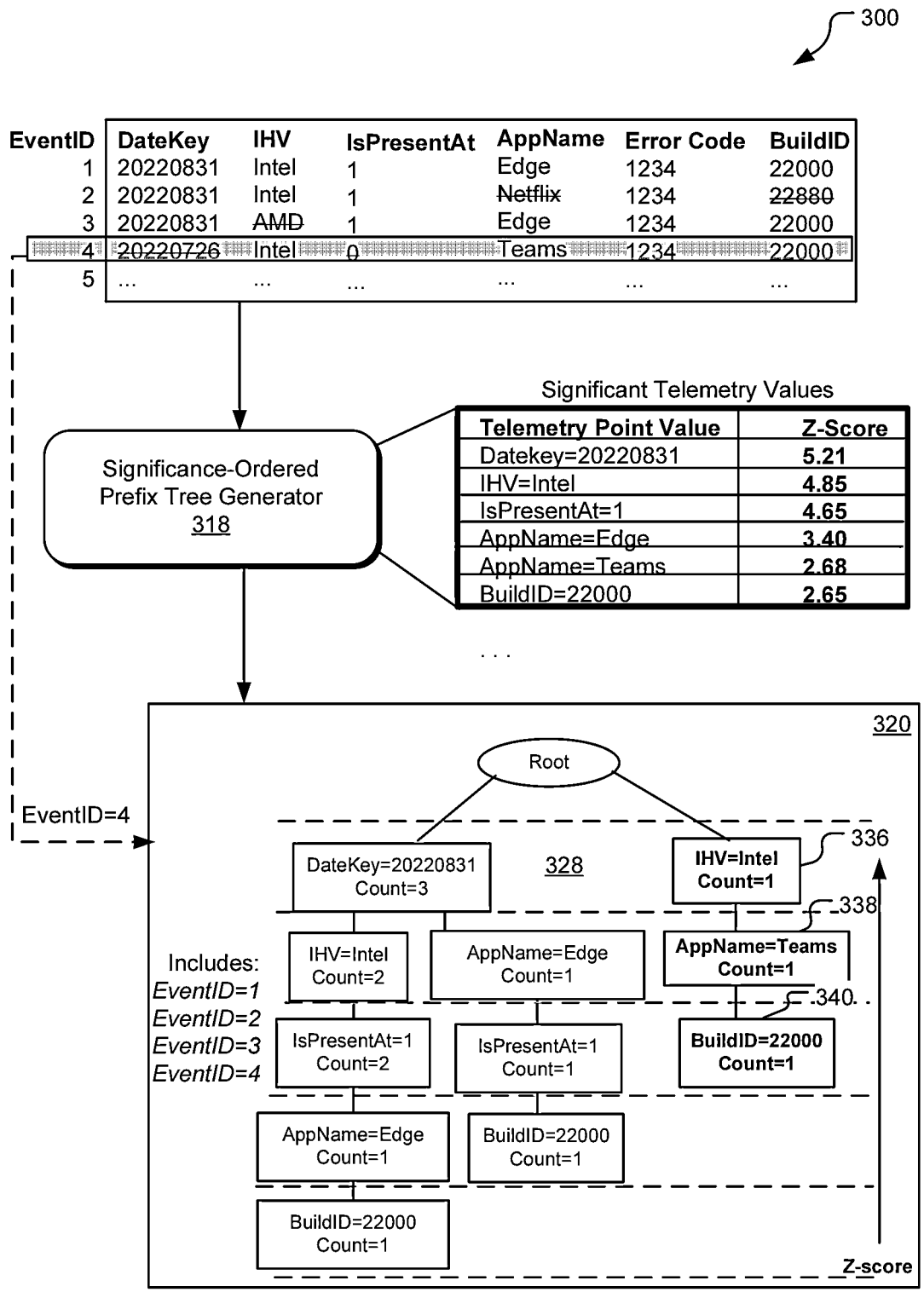
FIG. 3E illustrates example additional operations for populating a significance-ordered prefix tree performed by the system following those described above with respect to FIG. 3D.

FIG. 3E illustrates still further example additional operations for populating a significance-ordered prefix tree 320 performed by the system 300 following those described above with respect to FIG. 3D. Here, the telemetry point values of the fourth event (EventID=4) are added to nodes of the significance-ordered prefix tree 320 in order of decreasing Z-score from the top to the bottom of the tree. The Z-score ordered sequence of significant telemetry point values for EventID=4 includes: IHV=Intel®; AppName=Teams®; BuildID=22000.

These values are added to the significance-ordered tree one-by-one, per identical logic as that described above. First, it is determined whether the highest level 328 of the tree already includes a node storing the first telemetry point value of the Z-score ordered sequence for EventID=4 (e.g., IHV=Intel®). In this case, the highest level 328 does not already include a node storing this value (IHV=Intel®); consequently, a new node 336 is added to the highest level 328 of the tree (as connecting to the root node, as shown). This new node 336 stores the first value in the EventID=4 sequence (e.g., IHV=Intel®) and a counter that is initialized to 1.

The second value in the Z-score ordered sequence for EventID=4 is AppName=Teams®. It is determined that the last updated node (e.g., node 336) does not yet have a child node storing "AppName=Teams®." Consequently, the last-updated node 336 is given a new child node 338 that stores AppName=Teams® and that has a counter initialized at 1. The third and final value in the Z-score ordered sequence for EventID=4 is BuildID=22000. It is determined that the last updated node (e.g., node 338) does not yet have a child node storing "BuildID=22000." Consequently, the last-updated node 338 is given a new child node 340 that stores BuildID=22000, and that has a counter initialized at 1.

Assuming that the table 316 does not include any additional events, the significance-ordered prefix tree 320 is, at this point in time, finished (otherwise, each remaining event is added to the tree as described above with respect to the first four events in the table 316).

Figure 3F:
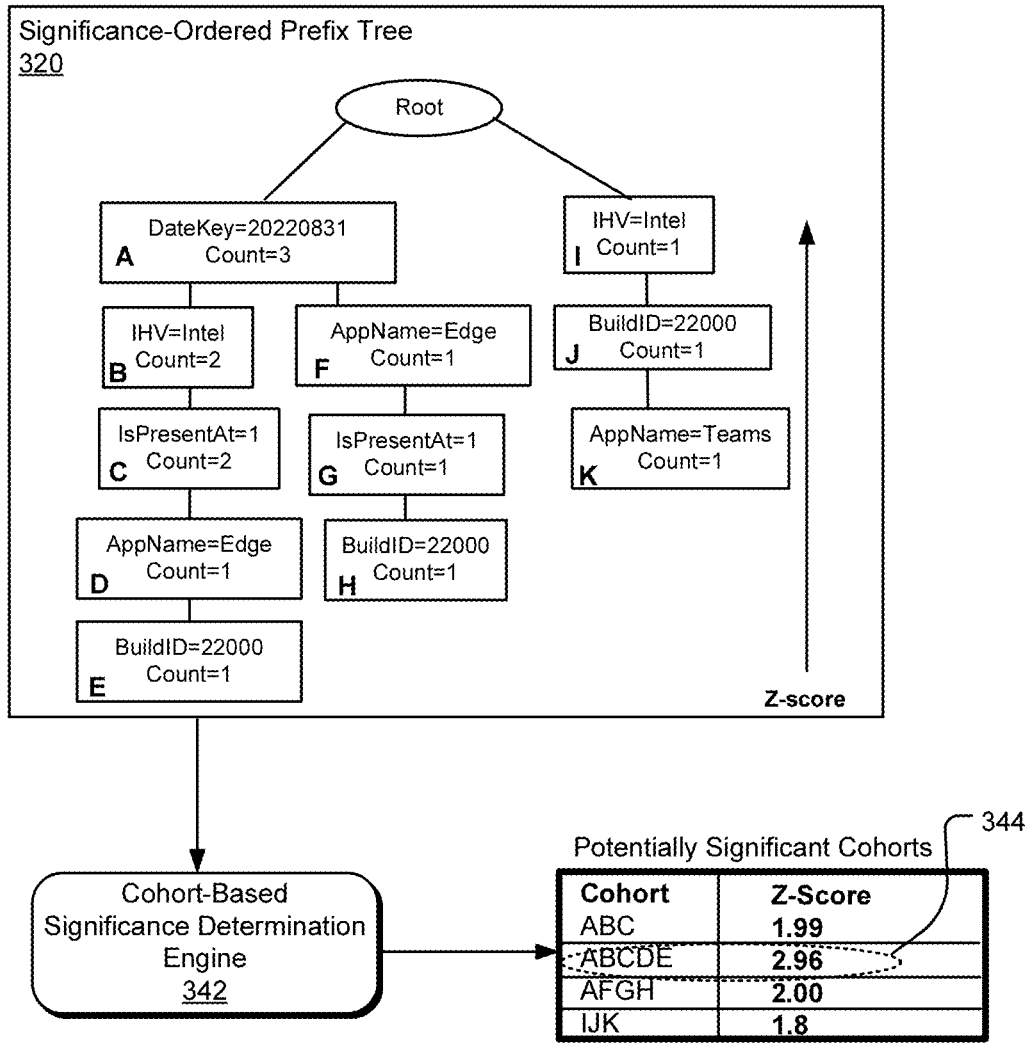
FIG. 3F illustrates example operations for using the significance-ordered prefix tree of FIG. 3E to identify significant cohorts.

FIG. 3F illustrates example operations for using the significance-ordered prefix tree 320 of FIG. 3E to identify significant cohorts. The operations described below with respect to FIG. 3F are performed following the operations described above with respect to FIG. 3E. At this point in time, the significance-ordered prefix tree 320 has been fully constructed. For illustration of concept and ease of concept, the nodes of the significance-ordered prefix tree 320 are, in FIG. 3F, labeled with letters A-K. Using the significance-ordered prefix tree 320, a cohort-based significance determination engine 342 identifies a group of potentially significant cohorts consisting of the sequence of values stored along each root-to-leaf path and each root-to-branch path in the Z-score ordered prefix tree. In this example, node A is a branch node because it includes more than one child node. Node C is also a branch node because it stores a count value (2) that is larger than a stored count value of its one child node (D). In this case, the potentially significant cohorts include: ABC, ABCDE, AFGH, and IJK. A Z-score is computed for each cohort as described above with respect to the cohort significance assessment engine 220 of FIG. 2. From these cohort Z-scores, significant cohort(s) 344 are identified. As explained above, "significance" is defined based on a p-value that statistically corresponds to a two-population Z-score of 2.06. In this example, there is a single cohort examined with a Z-score above 2.06–ABCDE. This represents the sole significant cohort in this example.

This significant cohort(s) 344 are returned to the requesting application or user and used in the remainder of the root cause investigation, as described elsewhere herein.

Notably, the use of the significance-ordered prefix tree 320 as described with respect to FIG. 3A through 3F facilitates identification of the significant cohorts 344 in a small fraction of the time that it would otherwise take to mathematically compute Z-score for each different cohort existing in the initial event-based dataset. For example, Z-score calculation for all cohorts in the initial event-based dataset may take weeks, whereas the above-disclosed operations can be implemented to reduce this computational time to minutes or a few hours.

Figure 4:
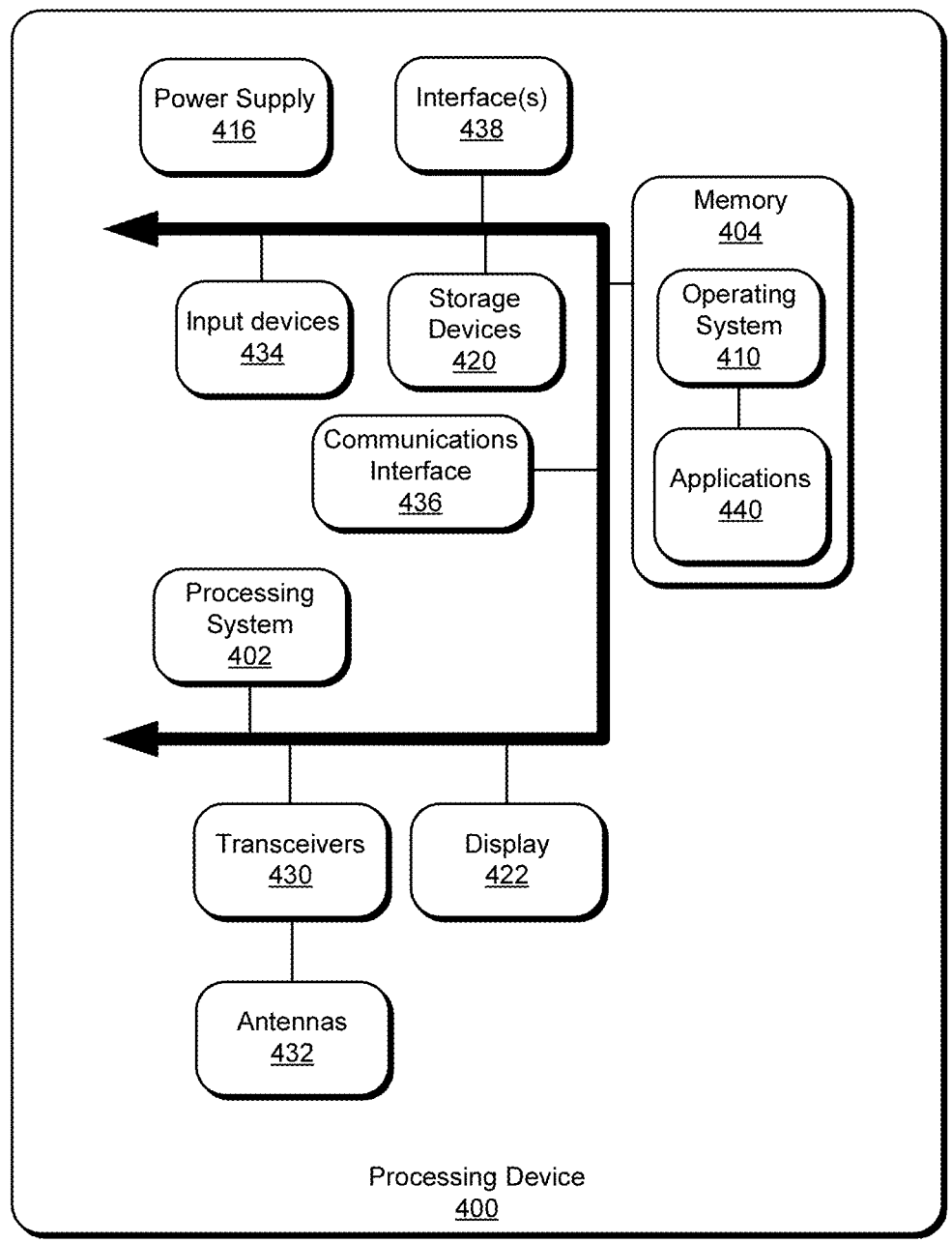
FIG. 4 illustrates an example schematic of a processing device suitable for implementing aspects of the disclosed technology.

FIG. 4 illustrates an example schematic of a processing device 400 suitable for implementing aspects of the disclosed technology. The processing device 400 includes a processing system 402, memory device(s) 404, a display 422, and other interfaces 438 (e.g., buttons). The processor unit(s) 402 may each include one or more computer processing units (CPUs), graphics processing units (GPUs), etc.

The memory 404 generally includes both volatile memory (e.g., random access memory (RAM)) and non-volatile memory (e.g., flash memory). An operating system 410, such as the Microsoft Windows® operating system, the Microsoft Windows® Phone operating system or a specific operating system designed for a gaming device, may reside in the memory 404 and be executed by the processing system 402, although it should be understood that other operating systems may be employed.

One or more applications 440 (e.g., the significant cohort identifier 217 of FIG. 2 and all of its subcomponents) are loaded in the memory 404 and executed on the operating system 410 by the processing system 402. In some implementations, aspects of the significant cohort identifier 217 are loaded into memory of different processing devices connected across a network. The applications 440 may receive inputs from one another as well as from various input local devices 434 such as a microphone, input accessory (e.g., keypad, mouse, stylus, touchpad, gamepad, racing wheel, joystick), or a camera.

Additionally, the applications 440 may receive input from one or more remote devices, such as remotely-located servers or smart devices, by communicating with such devices over a wired or wireless network using more communication transceivers 430 and an antenna 432 to provide network connectivity (e.g., a mobile phone network, Wi-Fi®, Bluetooth®). The processing device 400 may also include one or more storage devices 420 (e.g., non-volatile storage). Other configurations may also be employed. In one implementation, the significant cohort identifier 217 of FIG. 2 is an application executing on the processing device 400 or as a distributed application with different components executing on many different devices. The significant cohort identifier connects to a centralized telemetry storage repository over a network that stores telemetry data from many different devices.

The processing device 400 further includes a power supply 416, which is powered by one or more batteries or other power sources and which provides power to other components of the processing device 400. The power supply 416 may also be connected to an external power source (not shown) that overrides or recharges the built-in batteries or other power sources.

The processing device 400 may include a variety of tangible computer-readable storage media and intangible computer-readable communication signals. Tangible computer-readable storage can be embodied by any available media that can be accessed by the processing device 400 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes RAM, read-only memory (ROM), electrically erasable programmable read-only memory (EEPROM), flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 400. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, radio frequency (RF), infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

In some aspects, the techniques described herein relate to a method of identifying cohorts of telemetry point values that are statistically significant indicators of a computing event satisfying a condition of interest. The method include: computing Z-scores for a set of telemetry point values included in an event-based data set that includes telemetry data for multiple computing events; identifying, based on the Z-scores, significant telemetry point values that are statistically significant indicators of the condition of interest; generating a significance-ordered prefix tree based on the significant telemetry point values and the Z-scores, the significance-ordered prefix tree having different hierarchical levels populated with nodes corresponding to the significant telemetry point values and edges connecting nodes storing pairs of the significant telemetry point values co-observed with respect to one or more events of multiple computing events; for each path of multiple different paths within the significance-ordered prefix tree, compute a cohort Z-score for a cohort including the significant telemetry point values corresponding to nodes along the path; and based on the cohort Z-score computed for the cohorts corresponding to the multiple different paths, identifying a subset of the cohorts that are statistically significant indicators of the condition of interest; and using the subset of cohorts to identify a root cause of the condition of interest.

In some aspects, the techniques described herein relate to a method, further including: identifying potentially significant cohorts from the significance-ordered prefix tree, each of the potentially significant cohorts corresponding to a different root-to-leaf path or root-to-branch path within the significance-ordered prefix tree, wherein the cohort Z-score is computing for each of the potentially significant cohorts.

In some aspects, the techniques described herein relate to a method, the significance-ordered prefix tree includes multiple root-to-leaf paths, each of the multiple root-to-leaf paths being populated with a subset of the significant telemetry point values co-observed during one or more of the multiple computing events, the significant telemetry point values being arranged in decreasing order of Z-scores as the root-to-leaf path is traversed away from a root node.

In some aspects, the techniques described herein relate to a method, wherein generating the significance-ordered prefix tree further includes: for each event of the multiple computing events in the event-based dataset, creating a Z-score ordered sequence of the significant telemetry point values for the event; and sequentially populating nodes occupying a consecutive sequence of the different hierarchical levels with the significant telemetry point values for the event arranged in order of the Z-score ordered sequence.

In some aspects, the techniques described herein relate to a method, wherein generating the significance-ordered prefix tree further includes: for a first telemetry point value in the Z-score ordered sequence for a first event, determining whether a node storing a first telemetry point value already exists at a highest level of the significance-ordered prefix tree; in response to determining that the node storing the first telemetry point value already exists at the highest level of the significance-ordered prefix tree, incrementing a count value of the node; in response to determining that the node storing the first telemetry point value does not yet exist at the highest level of the significance-ordered prefix tree, creating the node and incrementing the count value of the node; for a next telemetry point value at index N in the Z-score ordered sequence for the first event, determining whether a last-updated node in the significance-ordered prefix tree already has a child node storing the next telemetry point value; in response to determining that the last-updated node already has the child node storing the next telemetry point value, updating a count value of the child node; in response to determining that the last-updated node does not already have the child node storing the next telemetry point value, creating the child node of the last-updated node and updating the count value of the child node.

In some aspects, the techniques described herein relate to a method, wherein the condition of interest is a performance metric, the performance metric having been observed in association with each of the multiple computing events.

In some aspects, the techniques described herein relate to a method, wherein the condition of interest is an observed user behavior.

In some aspects, the techniques described herein relate to a method, wherein the significance-ordered prefix tree excludes a subset of the telemetry point values in the event-based dataset that are not determined to be among the significant telemetry point values.

In some aspects, the techniques described herein relate to a method, wherein the condition of interest is an error and wherein using the subset of cohorts to identify a root cause of the condition of interest further includes using the subset of cohorts to identify and replicate a compute environment in which the error is likely to be observed.

In some aspects, the techniques described herein relate to a system for reducing computational overhead in identifying cohorts of telemetry point values that are statistically significant indicators of a computing event satisfying a condition of interest. The system includes: a significant cohort identifier stored in memory that is executable to: compute Z-scores for the telemetry point values associated with multiple computing events in an event-based dataset; identify, based on the Z-scores, significant telemetry point values that are statistically significant indicators of a computing event satisfying a condition of interest; generate a significance-ordered prefix tree based on the significant telemetry point values and the Z-scores, the significance-ordered prefix tree having different hierarchical levels populated with nodes corresponding to the significant telemetry point values and edges connecting nodes storing pairs of the significant telemetry point values co-observed with respect to one or more events of multiple computing events; identify potentially significant cohorts from the significance-ordered prefix tree, each of the potentially significant cohorts corresponding to a different root-to-leaf path or root-to-branch path within the significance-ordered prefix tree; compute a Z-score for each cohort of the potentially significant cohorts; and identify, based on the Z-score for each of cohort, a subset of the potentially significant cohorts that are statistically significant indicators of a computing event satisfying the condition of interest.

In some aspects, the techniques described herein relate to a system, wherein the significance-ordered prefix tree includes multiple root-to-leaf paths, each of the multiple root-to-leaf paths being populated with a subset of the significant telemetry point values co-observed during one or more of the multiple computing events.

In some aspects, the techniques described herein relate to a system, wherein the significant telemetry point values are arranged in nodes along each of the multiple root-to-leaf paths in decreasing order of Z-score with increasing distance away from a root node.

In some aspects, the techniques described herein relate to a system, wherein generating the significance-ordered prefix tree further includes: for each event of the multiple computing events in the event-based dataset, creating a Z-score ordered sequence of the significant telemetry point values for the event; and sequentially populating nodes occupying a consecutive sequence of the different hierarchical levels with the significant telemetry point values for the event arranged in order of the Z-score ordered sequence of the significant telemetry point values.

In some aspects, the techniques described herein relate to a system, wherein generating the significance-ordered prefix tree further includes: for a first telemetry point value in the Z-score ordered sequence for a first event, determining whether a node storing a first telemetry point value already exists at a highest level of the significance-ordered prefix tree; in response to determining that the node storing the first telemetry point value already exists at the highest level of the significance-ordered prefix tree, incrementing a count value of the node; in response to determining that the node storing the first telemetry point value does not yet exist at the highest level of the significance-ordered prefix tree, creating the node and incrementing the count value of the node; for a next telemetry point value at an index N in the Z-score ordered sequence for the first event, determining whether a last-updated node in the significance-ordered prefix tree already has a child node storing the next telemetry point value; in response to determining that the last-updated node already has the child node storing the next telemetry point value, updating a count value of the child node; in response to determining that the last-updated node does not already have the child node storing the next telemetry point value, creating the child node of the last-updated node and updating the count value of the child node.

In some aspects, the techniques described herein relate to a system, wherein the significance-ordered prefix tree excludes a subset of the telemetry point values in the event-based dataset that are not determined to be among the significant telemetry point values.

In some aspects, the techniques described herein relate to a tangible computer-readable storage media encoding computer executable instructions for executing a reduced-overhead computer process for efficiently identifying cohorts of telemetry point values that are statistically significant indicators of a computing event satisfying a condition of interest, the reduced-overhead computer process including: computing Z-scores for a set of telemetry point values included in an event-based data set including telemetry data for multiple computing events; identifying, based on the Z-scores, significant telemetry point values that are statistically significant indicators of a computing event satisfying a condition of interest; generating a significance-ordered prefix tree based on the significant telemetry point values and the Z-scores, the significance-ordered prefix tree having different hierarchical levels populated with nodes corresponding to the significant telemetry point values and edges connecting nodes storing pairs of the significant telemetry point values co-observed with respect to one or more events of multiple computing events; identifying potentially significant cohorts from the significance-ordered prefix tree, each of the potentially significant cohorts corresponding to a different root-to-leaf path or root-to-branch path within the significance-ordered prefix tree; computing a Z-score for each cohort of the potentially significant cohorts; and identifying, based on the Z-score for each of cohort, a subset of the potentially significant cohorts that are statistically significant indicators of the computing event satisfying the condition of interest.

In some aspects, the techniques described herein relate to a tangible computer-readable storage media, wherein the significance-ordered prefix tree includes multiple root-to-leaf paths, each of the multiple root-to-leaf paths being populated with a subset of the significant telemetry point values co-observed during one or more of the multiple computing events.

In some aspects, the techniques described herein relate to a tangible computer-readable storage media, wherein the significant telemetry point values are arranged in nodes along each of the multiple root-to-leaf paths in decreasing order of Z-score with increasing distance away from a root node.

In some aspects, the techniques described herein relate to a tangible computer-readable storage media, wherein generating the significance-ordered prefix tree further includes: for an event of the multiple computing events in the event-based dataset, creating a Z-score ordered sequence of the significant telemetry point values for the event; and sequentially populating nodes occupying a consecutive sequence of the different hierarchical levels with the significant telemetry point values for the event arranged in order of the Z-score ordered sequence.

In some aspects, the techniques described herein relate to a tangible computer-readable storage media, wherein generating the significance-ordered prefix tree further includes: for a first telemetry point value in the Z-score ordered sequence for a first event, determining whether a node storing a first telemetry point value already exists at a highest level of the significance-ordered prefix tree; in response to determining that the node storing the first telemetry point value already exists at the highest level of the significance-ordered prefix tree, incrementing a count value of the node; in response to determining that the node storing the first telemetry point value does not yet exist at the highest level of the significance-ordered prefix tree, creating the node and incrementing the count value of the node; for a next telemetry point value at index N in the Z-score ordered sequence for the first event, determining whether a last-updated node in the significance-ordered prefix tree already has a child node storing the next telemetry point value; in response to determining that the last-updated node already has the child node storing the next telemetry point value, updating a count value of the child node; in response to determining that the last-updated node does not already have the child node storing the next telemetry point value, creating the child node of the last-updated node and updating the count value of the child node.

In some aspects, the techniques described herein relate to a system for reducing computational overhead in identifying cohorts of telemetry point values that are statistically significant indicators of a computing event satisfying a condition of interest. The system includes: a means for computing Z-scores for the telemetry point values associated with multiple computing events in an event-based dataset; means for identifying, based on the Z-scores, significant telemetry point values that are statistically significant indicators of a computing event satisfying a condition of interest; a means for generating a significance-ordered prefix tree based on the significant telemetry point values and the Z-scores, the significance-ordered prefix tree having different hierarchical levels populated with nodes corresponding to the significant telemetry point values and edges connecting nodes storing pairs of the significant telemetry point values co-observed with respect to one or more events of multiple computing events; a means for identifying potentially significant cohorts from the significance-ordered prefix tree, each of the potentially significant cohorts corresponding to a different root-to-leaf path or root-to-branch path within the significance-ordered prefix tree; compute a Z-score for each cohort of the potentially significant cohorts; and a means for identifying, based on the Z-score for each of cohort, a subset of the potentially significant cohorts that are statistically significant indicators of a computing event satisfying the condition of interest.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of example implementations.

What is claimed is:

1. A method of identifying cohorts of telemetry point values that are statistically significant indicators of a computing event satisfying a condition of interest, the method comprising:
    computing Z-scores for a set of telemetry point values included in an event-based data set that includes telemetry data for multiple computing events;
    identifying, based on the Z-scores, significant telemetry point values that are statistically significant indicators of the condition of interest;
    generating a significance-ordered prefix tree based on the significant telemetry point values and the Z-scores, the significance-ordered prefix tree having different hierarchical levels populated with nodes corresponding to the significant telemetry point values and edges connecting nodes storing pairs of the significant telemetry point values co-observed with respect to one or more events of multiple computing events;
    for each path of multiple different paths within the significance-ordered prefix tree, compute a cohort Z-score for a cohort comprising the significant telemetry point values corresponding to nodes along the path; and
    based on the cohort Z-score computed for the cohorts corresponding to the multiple different paths, identifying a subset of the cohorts that are statistically significant indicators of the condition of interest; and
    using the subset of cohorts to identify a root cause of the condition of interest.

2. The method of claim 1, further comprising: identifying potentially significant cohorts from the significance-ordered prefix tree, each of the potentially significant cohorts corresponding to a different root-to-leaf path or root-to-branch path within the significance-ordered prefix tree, wherein the cohort Z-score is computing for each of the potentially significant cohorts.

3. The method of claim 1, the significance-ordered prefix tree includes multiple root-to-leaf paths, each of the multiple root-to-leaf paths being populated with a subset of the significant telemetry point values co-observed during one or more of the multiple computing events, the significant telemetry point values being arranged in decreasing order of Z-scores as the root-to-leaf path is traversed away from a root node.

4. The method of claim 1, wherein generating the significance-ordered prefix tree further includes:
    for each event of the multiple computing events in the event-based dataset, creating a Z-score ordered sequence of the significant telemetry point values for the event; and
    sequentially populating nodes occupying a consecutive sequence of the different hierarchical levels with the significant telemetry point values for the event arranged in order of the Z-score ordered sequence.

5. The method of claim 4, wherein generating the significance-ordered prefix tree further includes:
    for a first telemetry point value in the Z-score ordered sequence for a first event, determining whether a node storing a first telemetry point value already exists at a highest level of the significance-ordered prefix tree;
    in response to determining that the node storing the first telemetry point value already exists at the highest level of the significance-ordered prefix tree, incrementing a count value of the node;
    in response to determining that the node storing the first telemetry point value does not yet exist at the highest level of the significance-ordered prefix tree, creating the node and incrementing the count value of the node;
    for a next telemetry point value at index N in the Z-score ordered sequence for the first event, determining whether a last-updated node in the significance-ordered prefix tree already has a child node storing the next telemetry point value;
    in response to determining that the last-updated node already has the child node storing the next telemetry point value, updating a count value of the child node;
    in response to determining that the last-updated node does not already have the child node storing the next telemetry point value, creating the child node of the last-updated node and updating the count value of the child node.

6. The method of claim 1, wherein the condition of interest is a performance metric, the performance metric having been observed in association with each of the multiple computing events.

7. The method of claim 1, wherein the condition of interest is an observed user behavior.

8. The method of claim 1, wherein the significance-ordered prefix tree excludes a subset of the telemetry point values in the event-based dataset that are not determined to be among the significant telemetry point values.

9. The method of claim 1, wherein the condition of interest is an error and wherein using the subset of cohorts to identify a root cause of the condition of interest further comprises using the subset of cohorts to identify and replicate a compute environment in which the error is likely to be observed.

10. A system for reducing computational overhead in identifying cohorts of telemetry point values that are statistically significant indicators of a computing event satisfying a condition of interest, the system comprising:
    a significant cohort identifier stored in memory that is executable to:

compute Z-scores for the telemetry point values associated with multiple computing events in an event-based dataset;

identify, based on the Z-scores, significant telemetry point values that are statistically significant indicators of a computing event satisfying a condition of interest;

generate a significance-ordered prefix tree based on the significant telemetry point values and the Z-scores, the significance-ordered prefix tree having different hierarchical levels populated with nodes corresponding to the significant telemetry point values and edges connecting nodes storing pairs of the significant telemetry point values co-observed with respect to one or more events of multiple computing events;

identify potentially significant cohorts from the significance-ordered prefix tree, each of the potentially significant cohorts corresponding to a different root-to-leaf path or root-to-branch path within the significance-ordered prefix tree;

compute a Z-score for each cohort of the potentially significant cohorts; and identify, based on the Z-score for each of cohort, a subset of the potentially significant cohorts that are statistically significant indicators of a computing event satisfying the condition of interest.

11. The system of claim 10, wherein the significance-ordered prefix tree includes multiple root-to-leaf paths, each of the multiple root-to-leaf paths being populated with a subset of the significant telemetry point values co-observed during one or more of the multiple computing events.

12. The system of claim 11, wherein the significant telemetry point values are arranged in nodes along each of the multiple root-to-leaf paths in decreasing order of Z-score with increasing distance away from a root node.

13. The system of claim 10, wherein generating the significance-ordered prefix tree further includes:

for each event of the multiple computing events in the event-based dataset, creating a Z-score ordered sequence of the significant telemetry point values for the event; and sequentially populating nodes occupying a consecutive sequence of the different hierarchical levels with the significant telemetry point values for the event arranged in order of the Z-score ordered sequence of the significant telemetry point values.

14. The system of claim 13, wherein generating the significance-ordered prefix tree further includes:

for a first telemetry point value in the Z-score ordered sequence for a first event, determining whether a node storing a first telemetry point value already exists at a highest level of the significance-ordered prefix tree;

in response to determining that the node storing the first telemetry point value already exists at the highest level of the significance-ordered prefix tree, incrementing a count value of the node;

in response to determining that the node storing the first telemetry point value does not yet exist at the highest level of the significance-ordered prefix tree, creating the node and incrementing the count value of the node;

for a next telemetry point value at an index N in the Z-score ordered sequence for the first event, determining whether a last-updated node in the significance-ordered prefix tree already has a child node storing the next telemetry point value;

in response to determining that the last-updated node already has the child node storing the next telemetry point value, updating a count value of the child node;

in response to determining that the last-updated node does not already have the child node storing the next telemetry point value, creating the child node of the last-updated node and updating the count value of the child node.

15. The system of claim 10, wherein the significance-ordered prefix tree excludes a subset of the telemetry point values in the event-based dataset that are not determined to be among the significant telemetry point values.

16. A tangible computer-readable storage media encoding computer executable instructions for executing a reduced-overhead computer process for efficiently identifying cohorts of telemetry point values that are statistically significant indicators of a computing event satisfying a condition of interest, the reduced-overhead computer process comprising:

computing Z-scores for a set of telemetry point values included in an event-based data set including telemetry data for multiple computing events;

identifying, based on the Z-scores, significant telemetry point values that are statistically significant indicators of a computing event satisfying a condition of interest;

generating a significance-ordered prefix tree based on the significant telemetry point values and the Z-scores, the significance-ordered prefix tree having different hierarchical levels populated with nodes corresponding to the significant telemetry point values and edges connecting nodes storing pairs of the significant telemetry point values co-observed with respect to one or more events of multiple computing events;

identifying potentially significant cohorts from the significance-ordered prefix tree, each of the potentially significant cohorts corresponding to a different root-to-leaf path or root-to-branch path within the significance-ordered prefix tree;

computing a Z-score for each cohort of the potentially significant cohorts; and identifying, based on the Z-score for each of cohort, a subset of the potentially significant cohorts that are statistically significant indicators of the computing event satisfying the condition of interest.

17. The tangible computer-readable storage media of claim 16, wherein the significance-ordered prefix tree includes multiple root-to-leaf paths, each of the multiple root-to-leaf paths being populated with a subset of the significant telemetry point values co-observed during one or more of the multiple computing events.

18. The tangible computer-readable storage media of claim 17, wherein the significant telemetry point values are arranged in nodes along each of the multiple root-to-leaf paths in decreasing order of Z-score with increasing distance away from a root node.

19. The tangible computer-readable storage media of claim 17, wherein generating the significance-ordered prefix tree further includes:

for an event of the multiple computing events in the event-based dataset, creating a Z-score ordered sequence of the significant telemetry point values for the event; and sequentially populating nodes occupying a consecutive sequence of the different hierarchical levels with the significant telemetry point values for the event arranged in order of the Z-score ordered sequence.

20. The tangible computer-readable storage media of claim 19, wherein generating the significance-ordered prefix tree further includes:
- for a first telemetry point value in the Z-score ordered sequence for a first event, determining whether a node storing a first telemetry point value already exists at a highest level of the significance-ordered prefix tree;
- in response to determining that the node storing the first telemetry point value already exists at the highest level of the significance-ordered prefix tree, incrementing a count value of the node;
- in response to determining that the node storing the first telemetry point value does not yet exist at the highest level of the significance-ordered prefix tree, creating the node and incrementing the count value of the node;
- for a next telemetry point value at index N in the Z-score ordered sequence for the first event, determining whether a last-updated node in the significance-ordered prefix tree already has a child node storing the next telemetry point value;
- in response to determining that the last-updated node already has the child node storing the next telemetry point value, updating a count value of the child node;
- in response to determining that the last-updated node does not already have the child node storing the next telemetry point value, creating the child node of the last-updated node and updating the count value of the child node.

\* \* \* \* \*